R. F. BOETTIGER.
ELECTRIC STOVE.
APPLICATION FILED MAR. 15, 1915.

1,143,883.

Patented June 22, 1915.
2 SHEETS—SHEET 1.

Witnesses

R. F. Boettiger  Inventor by C. A. Snow & Co.
Attorneys

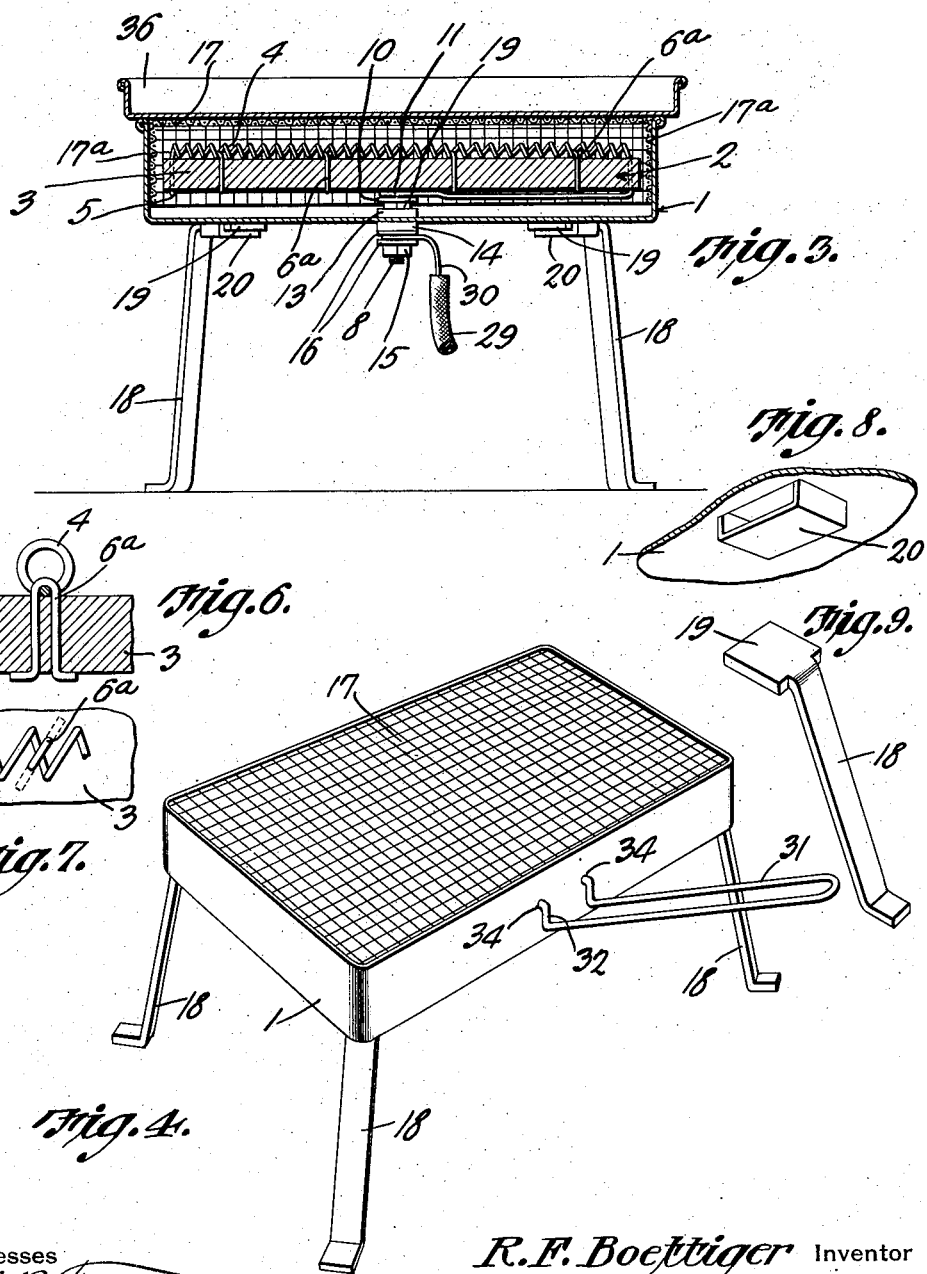

UNITED STATES PATENT OFFICE.

RICHARD F. BOETTIGER, OF ABERDEEN, WASHINGTON.

ELECTRIC STOVE.

1,143,883.   Specification of Letters Patent.   Patented June 22, 1915.

Application filed March 15, 1915. Serial No. 14,437.

*To all whom it may concern:*

Be it known that I, RICHARD F. BOETTIGER, a citizen of the United States, residing at Aberdeen, in the county of Chehalis and State of Washington, have invented a new and useful Electric Stove, of which the following is a specification.

The present invention appertains to electric heaters or stoves, and aims to provide a novel and improved electrical appliance of that nature.

One of the objects of the invention is to provide an electric stove or heater which is capable of inexpensive manufacture, so that the price thereof will be within reach of all, the device being simple and compact in construction, but still being thoroughly efficient and practical in use.

Another object of the invention, is the provision of a novel, yet simple and effective heating unit for the stove.

A further object of this invention, is the provision of novel means for assembling the heating unit with the frame or body of the stove or heater, and the conductors.

A still further object of the invention is to provide an electric stove, the several parts of which may be readily separated or detached for purpose of compact storage or shipment, and also to enable the component parts to be readily separated for purpose of repair, cleaning or replacement. The collapsible feature of the invention is also of advantage, since it enables the device, when collapsed, to be stored within a small receptacle, which, when the stove is set up, is sufficiently small to be used in connection with the stove for containing the vegetables, cereals, or other matter to be cooked or boiled.

It is also within the scope of the invention, to provide an electric stove which is improved generally in its construction and details, to enhance the utility thereof.

With the foregoing and other objects in view which will appear as the description proceeds, the invention resides in the combination and arrangement of parts and in the details of construction hereinafter described and claimed, it being understood that changes in the precise embodiment of the invention herein disclosed can be made without departing from the spirit of the invention.

The invention is illustrated in its preferred embodiment in the accompanying drawings, wherein:—

Figure 1:
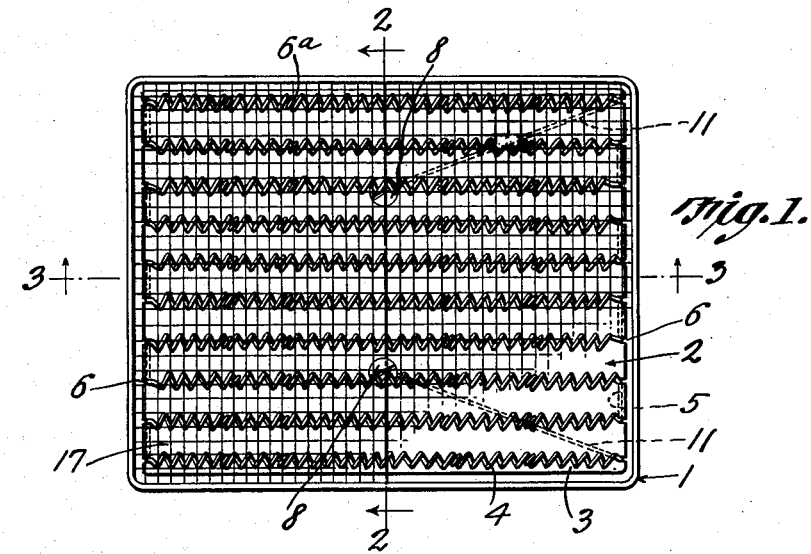
Figure 5:
Figure 2:
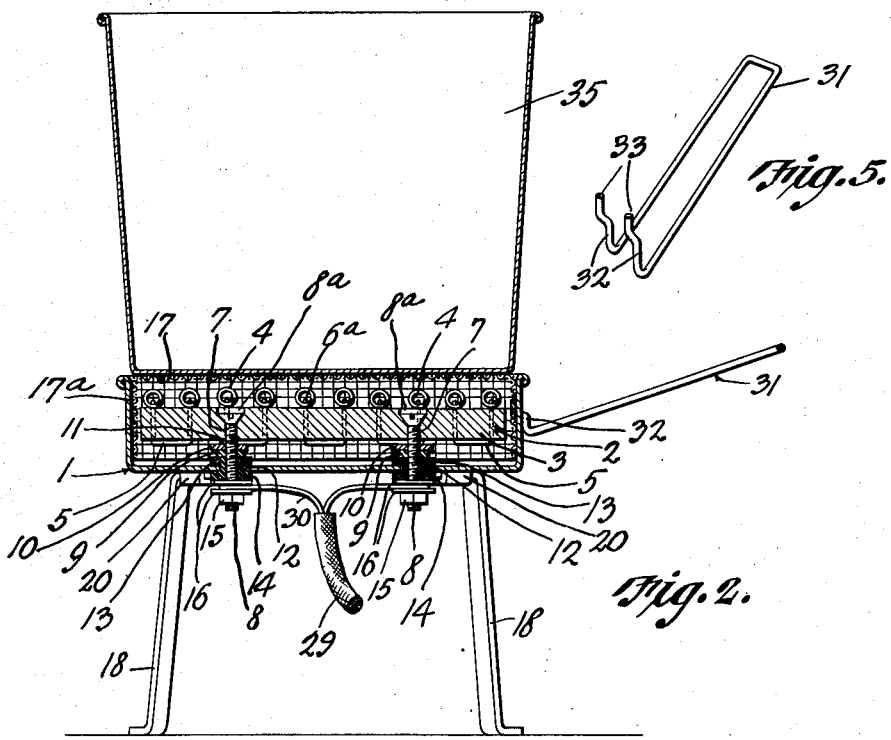

Figure 1 is a plan view of the improved electric stove, portions being broken away. Fig. 2 is a transverse section thereof, taken on the line 2—2 and illustrating the receptacle for housing the collapsed stove, seated thereon to serve as a cooking or boiling utensil. Fig. 3 is a longitudinal section of the stove, taken on the line 3—3 of Fig. 1, and illustrating the cover or lid of the receptacle seated upon the stove to serve as a spider or frying pan. Fig. 4 is a perspective view of the stove. Fig. 5 is a perspective view of the handle. Fig. 6 is an enlarged sectional detail of the heating unit. Fig. 7 is an enlarged fragmental plan view of the heating unit. Fig. 8 is an enlarged fragmental perspective view illustrating the leg engaging means of the pan. Fig. 9 is a perspective view of one leg.

In carrying out the invention, the body or frame of the stove, is preferably, although not necessarily, in the form of a rectangular pan 1, which may be suitably finished for purpose of wear and appearance, and which is preferably formed from sheet metal.

The pan 1 contains the heating unit 2, which embodies a rectangular base 3 disposed within the pan 1 between the bottom and mouth thereof, and having its edges and ends spaced from the sides and ends, respectively, of the rim of the pan. The pan 1 is just sufficiently deep to allow for a moderate air space above and below the heating unit base 3 within the pan, whereby the air may circulate freely over, around and under the base 3. The base 3 is cut from a slab embodying a composition of asbestos and cement, whereby the base 3 will be an insulator, so as to be a non-conductor of electrical energy and heat. The slab from which the base 3 is cut, is soft enough to allow the same to be sawed or cut, is tough enough to withstand rough usage, and is rigid enough to remain flat under the strains and conditions to which the heating unit is subjected. The heating unit also includes a conductor or wire having sufficient resistance for the intended purposes, and which is bent or formed into heating coils or elements 4, extending longitudinally over the base 3, and having their ends connected in pairs by U-shaped yokes 5, whereby the coils 4 are connected in series. The arms of the yokes 5 of the electrical conductor or wire are engaged in notches or kerfs 6 cut or sawed in the end of the base 3, and the intermediate portions of the yokes 5 engage under the base 3 between the slots or notches 6, to hold the heating coils 4 in the proper position upon the base 3. It is obvious, that the conductor is readily applied to the base 3 in the foregoing manner.

Staples 6a straddle the convolutions of the resistance coils 4 and are engaged downwardly through the base 3 and clenched or bent therebelow, whereby the staples will anchor the convolutions of the coils upon the base and will therefore prevent the coils from becoming displaced.

In order to support the base 3 within the pan 1 and spaced from the walls and bottom thereof, the base 3 is provided with a pair of spaced apertures 7, through which bolts 8 extend, the bolts 8 having upper counter-sunk heads which fit within counter-sunk recesses 8a in the top of base 3, so that the heads of the bolts 8 will lie below the upper surface of the base 3. The bolts 8 are secured to the base 3, by means of nuts 9 threaded upon the bolts 8 below the base 3, washers 10 being preferably disposed upon the bolts 8 between the nuts 9 and base 3. The terminal portions 11 of the conductor 4—5 of the heating unit are clamped between the washers 10 and base 3, whereby the bolts 8 serve as binding posts for the attachment of the terminals of the heating unit conductor. The bolts 8 project downwardly or depend from the base 3, and pass through apertures 12 provided in the bottom of the pan 1, and insulating washers or elements 13 and 14 are mounted upon the bolts 8 above and below the bottom of the pan 1, respectively, and the bolts 8 are clamped to the bottom of the pan, by means of nuts 15 threaded upon the lower protruding ends of the bolts. The nuts 9 seat upon the washers or insulators 13, and the nuts 15 being tightened, cause the washers or insulators 13 and 14 to clamp the bottom of the pan, and hold the bolts 8 rigid. In this manner, the base 3 is held rigidly within the pan above the bottom thereof. A pair of metallic washers 16 is disposed upon each bolt 8 between the corresponding nut 15 and insulator 14, the parts 8, 9, 10, 15 and 16 being metallic, so as to act as conductors for carrying the electrical energy to and from the terminals 11 of the heating unit conductor.

The heating coils 4 are protected by means of a coarse meshed wire guard 17 disposed over the mouth of the pan 1 and over the coils 4, flush with the rim of the pan, the marginal positions of the guard 17 being downturned, as at 17a, and fitting within the walls of the pan to support the guard. The guard also serves to support the sad iron, vessel, or other object being heated, above the coils 4.

The pan 1, which forms the body or frame of the stove, is supported by means of detachable corner legs 18, which have the angularly projecting portions 19 at their upper ends adapted to be received by down-struck portions 20 of the bottom of the pan 1. Thus, the portions 19 of the legs 18 may be readily slipped into the down-struck portions 20 for attaching the legs to the pan.

The electrical cord 29, containing the electrical conductors 30 has the terminals of the conductors clamped between the washers 16 of the two pairs, to electrically connect the conductors 30 with the bolts 8. Thus, the bolts 8 serve as binding posts for the attachment of the terminals 11 of the heating unit conductor, and the terminals of the conductors 30, serve to hold the heating unit in place within the pan, and also serve as conductors for carrying the electrical energy between the conductors 30 and heating unit conductor. This simplifies the construction and renders the same inexpensive as well as efficient and serviceable.

A detachable doubled wire handle 31 is provided for lifting or handling the stove, the ends of the handle 31 having upturned portions 32 which are provided with offset fingers 33 adapted to be engaged through a pair of apertures 34 provided in one side of the pan 1, whereby the handle 31 may be readily employed for lifting the stove. The handle 31 may be detached when desired.

The stove is preferably furnished or sold with a receptacle 35, which is large enough to hold the stove when collapsed, and which is small enough to be used in connection with the stove for purposes of cooking, boiling, or the like. Thus, as suggested in Fig. 2, the receptacle 35 may be seated upon the stove, and when the legs 18 are detached from the pan 1, and when the handle is detached from the pan, the parts may be housed or stored within the receptacle 35, for purpose of compact and convenient storage or shipment. The pan or lid 36 of the receptacle 35 may also be used as a spider or frying pan as suggested in Fig. 3. If the stove were not collapsible, the receptacle 35 would no doubt have to be of such large proportions, to render it objectionable for boiling or cooking purposes in connection with the stove, but with the present arrangement, the receptacle 35 is satisfactory for both housing the collapsed stove, and for purpose of cooking. The receptacle 35 will hold the pan 1 and its heating unit 2, legs 18, handle, and cord 29 when the parts are separated, and as a result, the present device may be conveniently shipped or carried when traveling. The parts may be readily assembled and separated, and as a result, the device may be quickly cleaned or repaired.

The construction of the present device is such, that it may be cheaply manufactured and sold, in order that the price will not be prohibitive, it being noted that the component parts of the present device are simple and inexpensive to manufacture, and require no expensive dies, machine work, or the like. The number of parts are reduced to a minimum, but nevertheless, the stove is efficient and practical in use. The stove may be employed for divers purposes, such as for cooking, toasting, heating flat irons and the like, and may be made small enough as to require little electrical energy, but still have considerable heating efficiency.

From the foregoing, taken in connection with the drawings, it is thought that the other advantages and attributes of the present device will be obvious to those versed in the art, without further comment being necessary.

Having thus described the invention, what is claimed as new is:

An electric heater comprising a pan, a heating unit therein embodying a base and a conductor having heating elements extending across the base, a pair of bolts engaged through the said base and having upper heads, nuts threaded upon the bolts below the base for securing the bolts to the base, said nuts seating above the bottom of the pan, and the bolts extending through the said bottom of the pan, and nuts threaded upon the lower ends of the bolts for securing the same to the bottom of the pan and for the attachment of a pair of conductors to the bolts.

In testimony that I claim the foregoing as my own, I have hereto affixed my signature in the presence of two witnesses.

RICHARD F. BOETTIGER.

Witnesses:
T. N. SLOCUM,
B. F. CAUTHORN.